Sept. 14, 1948.  G. RATHENAU ET AL  2,449,412
TUNING INDICATOR FOR INDICATING RESONANCE
OF AN ELECTRIC CIRCUIT
Filed Feb. 8, 1947

GERARD RATHENAU
ARIE ANDRIES KRUITHOF
JOSEPH ANDRIES HARTVELD
INVENTORS

BY Fred M. Vogel
AGENT

Patented Sept. 14, 1948

2,449,412

UNITED STATES PATENT OFFICE 2,449,412

TUNING INDICATOR FOR INDICATING RESONANCE OF AN ELECTRIC CIRCUIT

Gerhard Rathenau, Arie Andries Kruithof, and Joseph Andries Hartveld, Eindhoven, Netherlands, assignors to Hartford National Bank and Trust Company, Hartford, Conn., as trustee Application February 8, 1947, Serial No. 727,440
In the Netherlands July 26, 1944

Section 1, Public Law 690, August 8, 1946
Patent expires July 26, 1964

4 Claims. (Cl. 250—40)

This invention relates to radio apparatus, more particularly a receiver with tuning indication by means of a gas discharge tube, and to a gas discharge tube suitable for use in this apparatus.

With the hitherto known devices of this kind it was customary to make use of a cathode ray tuning indicator to obtain an indication of the correct tuning of a receiver to a station. This was provided beside the station dial and did not permit an easy view of the pointer of the tuning dial and of the tuning indicator at the same time.

Furthermore it is known to use a gas discharge tube as an indicator, the luminous intensity being varied in accordance with the tuning accuracy for obtaining a tuning indication. This device has the drawback that the light variations obtained are insufficient in practice, due in part to the exponential sensitivity of the eye, for the obtainment of a distinct and readily visible indication.

According to the invention the said disadvantages are obviated by using as a tuning indicator a grid-controlled gas-discharge lamp which is preferably controlled in such a manner by the voltage received that the lamp extinguishes or ignites on correct tuning.

In order that the invention may be clearly understood and readily carried into effect, it will now be set out more fully with reference to the accompanying drawing, given by way of example, in which Fig. 1 represents one form of construction of a receiver according to the invention;

Fig. 1a relates to the operation of the device shown in Fig. 1.

Figure 1:
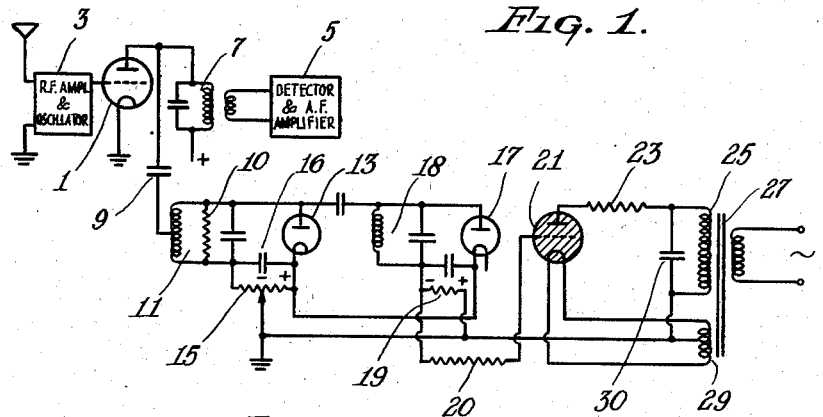

Of the receiver proper, Fig. 1 only shows one intermediate amplifying tube (1) in detail, whereas the remaining parts (3 and 5) which are not essential for an understanding of the invention and may have a common construction, are shown in block-form. Through a small coupling condenser 9, which is connected between the anode of the tube and a tapping point of a resonant circuit tuned to the middle frequency of the intermediate frequency band and strongly damped by a resistance 10, the anode circuit 7 of tube 1 is loosely coupled with this circuit. The voltage set up across this circuit is rectified by a diode 13.

The variations of the voltage set up across the load resistance 15 of the rectifier and brought about by any modulation of the voltage received, are smoothed by a parallel condenser 16. Part of the direct voltage thus obtained, which is a measure of the voltage received, is supplied, as a threshold voltage, to a second diode 17 which serves to rectify the high-frequency voltage set up across a resonant circuit 18 which is loosely coupled with the circuit 11 and whose damping is as low as possible. The output voltage occurring across the load resistance 19 of the detector 17 is supplied, through a high resistance 20 for limiting the grid current, to the control grid of a grid-controlled gas-discharge tube 21 which is preferably filled with neon. The anode of this tube is fed through a resistance 23 from a high voltage winding 25 of a transformer 27, for instance the supply transformer of the receiver, connected to the power mains. In addition the winding 25 may serve to generate the anode voltage of the receiver, whereas a second winding 29, which feeds the cathode of tube 21, may also be a winding available for other purposes. The resistance 23 and a condenser 30 shunting the winding 25 serve in a manner known per se, to avoid disturbances due to ignition of tube 21. The tube 21 is designed in such manner that at zero grid voltage ignition takes place during every period of the anode supply voltage, as a result of which the tube radiates a bright red light.

Figure 1A:
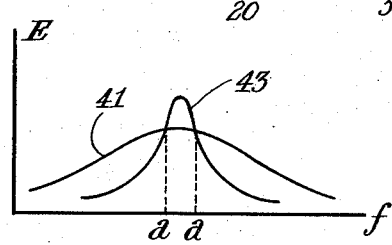

In Fig. 1a the curves 41 and 43 represent the variation of the voltage E across the circuits 11 and 18 as a function of the intermediate frequency occurring. If in tuning a receiver 3, 1, 5 a point is reached in which the receiver is sufficiently accurately tuned to the carrier wave of a station, both the circuit 11 and the circuit 18 are at least substantially in resonance (area a—a in Fig. 1a), the voltage across the "sharp" circuit 18 (curve 43) exceeding the threshold voltage (curve 41) supplied by the "flat" circuit 11, due to which a voltage, which is negative with regard to the grid of tube 21, is set up across the load resistance 19; this voltage prevents the tube from igniting periodically. The persisting extinction of the tube 21 is a very distinct indication of correct tuning. Thanks to the arrangement described comprising a sharp and a flat circuit, extinction of the tube 21 only occurs at the point of resonance i. e. in the area a—a of Fig. 1a, even during reception of powerful transmitters.

It is obvious that it is also possible to design the circuit in such manner that the tube ignites on correct tuning and is extinguished therebeyond. The advantage of the extinction on correct tuning is, however, that the listener is warned by ignition of the lamp that the set is no longer tuned accurately, for example due to frequency drift or the like.

Figure 2:
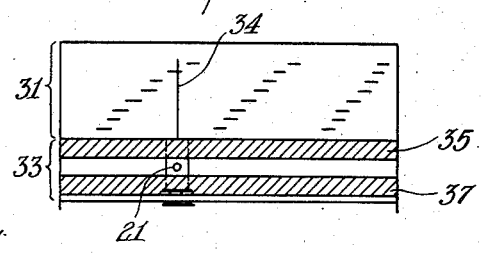
Fig. 2 shows the tuning dial of a receiver according to the invention.

Fig. 2 represents a station dial comprising a tuning indicator according to the invention. The dial comprises a part 31, on which the stations are recorded, and a part 33 in front of which the indicator tube 21 moves; the latter has a very small size, for example a length of some few centimeters and a diameter of, say, 10 mm.; it is secured to the bottom end of the pointer 34. The light of tube 21 is preferably concentrated in one point. The remaining part of the tube may be shielded by two opaque strips 35 and 37 from the dial portion 31. It is also possible to fasten the tube behind part 31 to the pointer; in this case the part 33 is omitted. Both constructions permit the observation of both the indicator and the pointer at the same time.

Figures 3A, 3B:
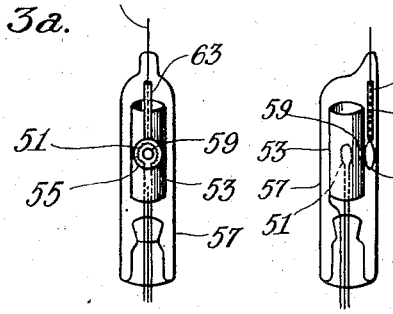
Figs. 3a, 3b and 3c are elevations of one form of construction of a gas discharge lamp which is particularly suitable for use in the receiver according to the invention.
Figure 3C:
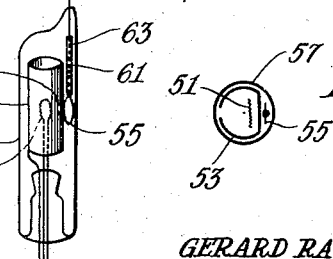

Figs. 3a, 3b and 3c represent a gas discharge tube particularly suitable for use in a radio receiver according to the invention. The lamp comprises a cathode 51, an essentially cylindrical control-grid electrode 53 surrounding this cathode, and an annular anode 55; these electrodes are lodged in an insulating envelope 57, for instance of glass, which may be filled with neon gas and closely surrounds the cylinder 53. The cylinder 53 is flattened over part of its circumference; this flattened part exhibits, approximately in the centre, an aperture 59. The annular cathode 51 and anode 55 are arranged on either side of this aperture, coaxially thereof and consequently parallel with the flat side of the cylinder, the anode being located in the space left by the flattened cylinder 53 inside the tube 57.

The ignition is concentrated in the aperture 59 and is clearly visible as a virtual point source of light through the ring 55, which has a larger inner diameter than the aperture 59. In order to prevent the glow of the cathode 51 from being visible during extinction, through the aperture 59 this electrode has a larger inner diameter than the aperture 59. As the envelope 57 closely surrounds the cylinder 55, the discharge is prevented from taking place also through the open ends of the cylinder—which for structural reasons is preferably not closed at its ends. In conjunction therewith the supply lead 61 of the anode is also shielded from the discharge preferably by means of an insulating envelope 63, for example a quartz tube 63. This supply lead is preferably not located at the same end of the tubular envelope 57 as the control electrode 53 and the cathode 51, in order to render the leakage path from the control electrode to the anode and hence the insulation resistance between these electrodes as long as possible. In this way positive leak voltages are prevented from finding their way from the anode to the grid and from unduly igniting the tube. In fact, the resistance 20 (Fig. 1) which separates the grid from earth has a very high value of say 10 MΩ, in order to minimise the load which the control-grid circuit of the lamp constitutes for the rectifier 17 and the circuit 18. In conjunction therewith the load resistance 19 also has a very high value, for instance 7 MΩ.

Owing to the construction as described the lamp has a very small size. In a practical construction the length of the envelope amounted to 50 mm. and the diameter to 11 mm. Owing to this small size the lamp is particularly suitable for being fastened, for instance in the manner shown in Fig. 2, to the pointer of a radio receiver. By concentrating the whole discharge in one point a simple construction of the grid as well as a high luminous intensity with a low consumption and in addition a very low control energy are obtained, which is desirable to the benefit of a minimum load of the circuit shown in Fig. 1.

The tube may be used, in addition to the object as described, for other indication purposes, for example to show the presence of a high frequency voltage of some few volts in a source of potential which cannot supply current. Again the tube may be used as a relay tube, if optical indication is desired at the same time.

What we claim is:

1. A device for indicating resonance of an electric circuit, particularly of the type employed in radio circuitry, comprising a tunable electric circuit, a dial and a movable index associated with said tunable electric circuit to indicate the setting thereof, a grid-controlled gaseous discharge tube mounted on said index, means to excite said gaseous discharge tube to provide a glow discharge therefrom, a first resonant circuit loosely coupled to said tunable electric circuit to produce a first voltage proportional to the voltage across said electric circuit, said first resonant circuit having a low damping, means to rectify said first voltage to produce a first potential proportional to the voltage across said tunable electric circuit, a second resonant circuit loosely coupled to said rectifying means to produce a second voltage proportional to the voltage across said tunable electric circuit, said second resonant circuit having a high damping, means to rectify said second voltage to produce a second potential proportional to the voltage across said tunable electric circuit, and means to apply said second potential to the grid of said gaseous discharge tube to modulate the glow discharge thereof to indicate resonance of said electric circuit.

2. A device for indicating resonance of an electric circuit, particularly of the type employed in radio circuitry, comprising an electric circuit, means to tune said electric circuit, a dial and a movable index associated with said tuning means to indicate the setting thereof, a grid-controlled gaseous discharge tube comprising an envelope and within said envelope a loop-shaped incandescent cathode, a cylindrical electrode surrounding said cathode and having an aperture arranged to mask said loop-shaped cathode, and an anode having an aperture coaxially arranged with respect to the aperture of said cylindrical electrode, said cylindrical electrode constituting the control electrode of said gaseous discharge tube, means to mount said gaseous discharge tube on said index, means to excite said gaseous discharge tube to provide a glow discharge therefrom, and means coupling said electric circuit to said gaseous discharge tube to modulate the glow discharge thereof to indicate resonance of said electric circuit.

3. A device for indicating resonance of an electric circuit, particularly of the type employed in radio circuitry, comprising an electric circuit, means to tune said electric circuit, a dial and a movable index associated with said tuning means to indicate the setting thereof, a grid-controlled gaseous discharge tube comprising an envelope and within said envelope a loop-shaped incandescent cathode, a cylindrical electrode surrounding said cathode, said cylindrical electrode having a flattened portion and having an aperture arranged in said flattened portion to mask said loop-shaped cathode, and an anode having an aperture coaxially arranged with respect to the aperture of said cylindrical electrode, said cylindrical electrode constituting the control electrode of said gaseous discharge tube, means to mount said gaseous discharge tube on said index, means to excite said gaseous discharge tube to provide a glow discharge therefrom, and means coupling said electric circuit to said gaseous discharge tube to modulate the glow discharge thereof to indicate resonance of said electric circuit.

4. A device for indicating resonance of an electric circuit, particularly of the type employed in radio circuitry, comprising an electric circuit, means to tune said electric circuit, a dial and a movable index associated with said tuning means to indicate the setting thereof, a grid-controlled gaseous discharge tube comprising an elongated envelope and within said envelope a loop-shaped incandescent cathode, a cylindrical electrode surrounding said cathode and having an aperture arranged to mask said loop-shaped cathode, and an annular anode having the aperture thereof coaxially arranged with respect to the aperture of said cylindrical electrode, said cylindrical electrode constituting the control electrode of said gaseous discharge tube, means to bring electrical leads for the cathode and control electrodes out of one end of said envelope, means to bring an electrical lead for the anode out of the other end of said envelope, means to mount said gaseous discharge tube on said movable index to move outside of the field of said dial, means to excite said gaseous discharge tube to provide a glow discharge therefrom, and means coupling said electric circuit to said gaseous discharge tube to modulate the glow discharge thereof to indicate resonance of said electric circuit.

GERHARD RATHENAU.
ARIE ANDRIES KRUITHOF.
JOSEPH ANDRIES HARTVELD.

REFERENCES CITED

The following references are of record in the file of this patent:

UNITED STATES PATENTS

| Number | Name | Date |
|---|---|---|
| 2,047,175 | Braselton | July 14, 1936 |
| 2,194,169 | Metcalfe | Mar. 19, 1940 |
| 2,223,825 | Holst et al. | Dec. 3, 1940 |
| 2,287,463 | Blue | June 23, 1942 |
| 2,334,473 | Carlson | Nov. 16, 1943 |

OTHER REFERENCES

Short Wave and Television for February 1937, pages 610 and 638. (Copy in Scientific Library.)